United States Patent [19]

Shinohara et al.

[11] Patent Number: 4,963,806
[45] Date of Patent: Oct. 16, 1990

[54] SERVO POSITIONING APPARATUS

[75] Inventors: Toru Shinohara, Kawasaki; Takatoshi Sato, Kumagaya, both of Japan

[73] Assignee: Fujitsu Limited, Kawasaki, Japan

[21] Appl. No.: 321,108

[22] Filed: Mar. 9, 1989

[30] Foreign Application Priority Data

Mar. 10, 1988 [JP] Japan .................................. 63-056979

[51] Int. Cl.$^5$ .............................................. G05B 6/02
[52] U.S. Cl. ................................... 318/621; 318/662; 360/77.13; 360/77.05
[58] Field of Search ................. 318/621, 662; 333/171, 333/172, 175, 176; 360/77.13, 77.05; 307/520

[56] References Cited

U.S. PATENT DOCUMENTS

| | | | |
|---|---|---|---|
| 2,996,689 | 8/1961 | Janz | 333/171 |
| 4,300,226 | 11/1981 | Barnette | 318/662 X |
| 4,540,946 | 9/1985 | Sainz | 307/520 |
| 4,638,384 | 1/1987 | Stewart | 360/77.05 |
| 4,656,529 | 4/1987 | Sakamoto | 360/77.13 X |

FOREIGN PATENT DOCUMENTS 0025606  3/1981  European Pat. Off. .

OTHER PUBLICATIONS

Samuels, IEEE Transactions on Magnetics, "Beyond the Second Order System in Track Following Servos", vol. 14, No. 4, Jul. 1978, N.Y., pp. 178–179, Figures 1–3.
D. R. Wilson, Electronics Letters, "Adaptive Compensation of Mechanical Resonances", vol. 3, No. 12, Dec. 1967, Engage GB.

Primary Examiner—William M. Shoop, Jr.
Assistant Examiner—Saul M. Bergmann
Attorney, Agent, or Firm—Staas & Halsey

[57] ABSTRACT

A notch filter, used in a servo loop, for dampening a mechanical resonance of a mechanism to be servo-controlled, including a serial T-type filter with a capacitor-resistor (CR) network having a serial connection of a first, second and third capacitors connected between an input terminal of the serial T-type filter and an output terminal of the Cr network; a first resistor connected between a return terminal of the CR network and an interconnection of the first and second capacitors; a second resistor connected between the return terminal and an interconnection of the second and third capacitors; and a third resistor connected in parallel to the three serial capacitors. A notch frequency of the notch filter is adjusted by varying the resistance values of the first and second resistors. The first and second resistors may include fixed and/or potentiometer-type variable resistors. An output from the CR network may be divided to be fed back to the return terminal to provide feedback. Amplifiers may be added to the output of the CR network and the feedback circuit to provide isolation. The first and second resistors for adjusting the notch frequency may be separately installed in a detachable disk unit which includes the mechanism to be servo-controlled. As a result, the notch frequency can be efficiently adjusted by replacing only two fixed resistors or by adjusting the variable resistor, and the cost of the disk unit can be reduced.

26 Claims, 8 Drawing Sheets

FIG. 8
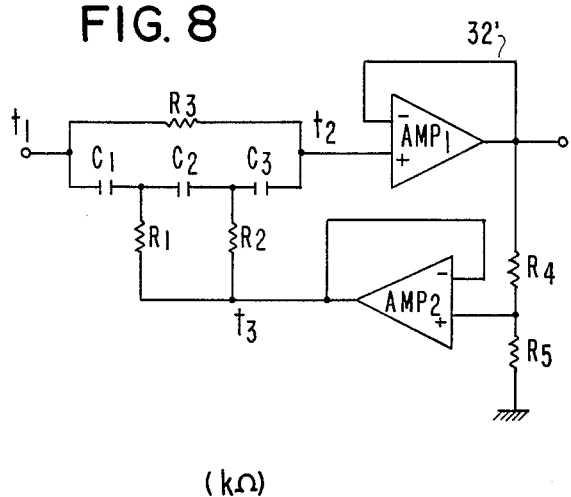
FIG. 9(a)
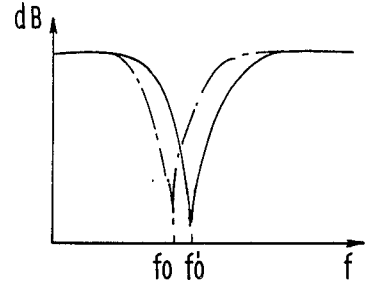
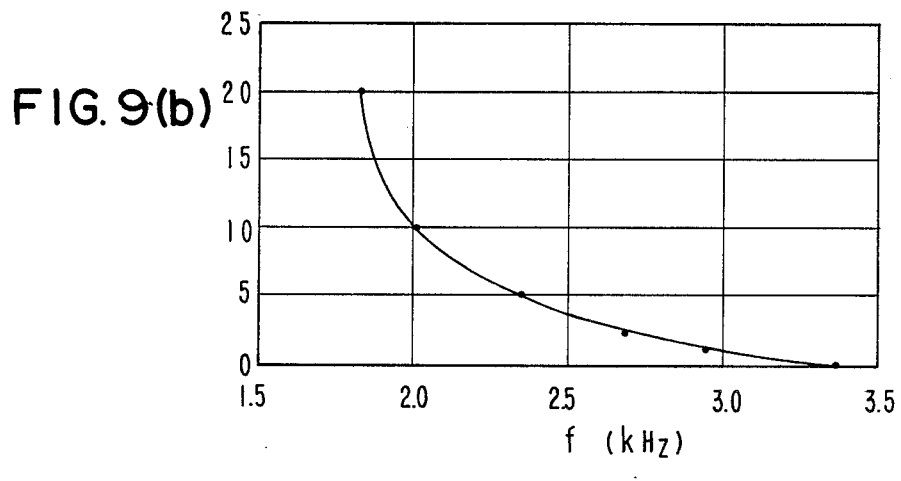
FIG. 9(b)
FIG. 10
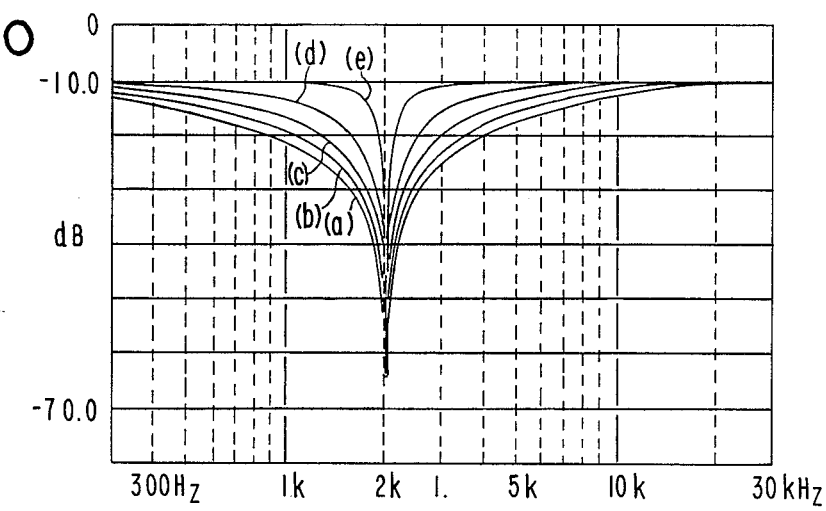

SERVO POSITIONING APPARATUS

BACKGROUND OF THE INVENTION

1. Field of the Invention

This invention relates to a servo positioning apparatus used, for example, to position a read/write head of a magnetic recording disk, and more particularly, it relates to efficient tuning of a filter used in a feedback loop of a servo control circuit.

2. Description of the Related Art

Servo positioning apparatuses have been widely employed for quickly and accurately positioning a mechanical element, such as a magnetic head of a magnetic recording disk apparatus. A typical servo control system for a recording disk apparatus is illustrated in FIG. 1. Magnetic recording disks 10 are mounted on an axle 11 driven by a spindle motor 12 thus enabling the magnetic recording disks 10 to spin. Magnetic heads 13 are mounted on accessors 140 which are connected to a movable part of a voice coil motor 14. The accessors 140 are moved in an essentially radial direction relative to the magnetic recording disks 10 by a coil 141 and a magnet 142 of the voice coil motor 14. Subsequent usage of the terms position and speed will refer to movement of the accessors 140 in the radial direction relative to the magnetic recording disks 10. This is known in the art as the seek direction.

The disks 10, axle 11, motors 12, 14 and heads 13 are typically installed in a magnetic disk unit 1 enclosed in a disk enclosure 16. The magnetic disk unit 1 is mounted in the main chassis of a magnetic disk apparatus but is detachable therefrom, for servicing, etc.

A coarse controller (i.e., a velocity control circuit) 2 generates a velocity error signal $\Delta V$ based upon a position signal PS obtained from a servo signal generated by the magnetic head 13. The details of the coarse controller 2 are described below. The position signal PS indicates the radial position of the magnetic head relative to the adjacent track and is generally designed to be zero when the head is at the center of a track being traced.

A fine controller or position controller 3 generates a position error signal $\Delta P$ based upon the position signal PS. The details of the fine controller 3 are described below. A movement controller 4 composed of a microprocessor calculates the number of tracks needed to be jumped according to an instruction from a host processor unit (not shown). The movement controller 4 switches between the coarse and fine modes by outputting a mode switching signal MS to a switch 5 and outputting an instruction to both the coarse controller 2 and the fine controller 3, each to drive the voice coil motor 14. The coarse controller 2, the fine controller 3, the movement controller 4, and the switch 5 compose a servo controller CT.

When the coarse mode is selected by the movement controller 4, the mode switching signal MS causes switch 5 to connect to terminal "a". As a result, a driving current $I_m$ proportional to the velocity error signal $\Delta V$ is supplied from the power amplifier 6 to the voice coil motor 14 via switch 5. Thus, the magnetic head 13 is moved to a destination track by a predetermined velocity schedule depending on the difference between a target velocity $V_c$ and an actual velocity $V_r$ of the magnetic head 13 obtained from the position signal PS. As illustrated in FIG. 2, upon detecting the magnetic head 13 having reached the destination track according to the position signal PS, the movement controller 4 issues a mode switching signal causing switch 5 to connect to terminal "b", thus selecting the fine controller 3. In FIG. 2, $a$ is the width of a track to be traced, and MS is the mode switching signal for switch 5.

The fine controller 3 delivers the position error signal $\Delta P$ to the power amplifier 6 via switch 5 for controlling the positioning of the magnetic head within the destination track. Accordingly, a driving current $I_m$ proportional to the position error signal $\Delta P$ is supplied from the power amplifier 6 to the voice coil motor 14.

Thus, a driving current $I_m$ proportional to the position error signal $\Delta P$ or the velocity error signal $\Delta V$ is supplied *from the power amplifier 6 to the voice coil motor 14. As a result, the magnetic head 13 is controlled to trace or move to a destination track.

Moreover, as shown in FIG. 3, the moving parts of the servo positioning apparatus naturally have a mechanical resonance. Therefore, a notch filter 32 (FIG. 4) has been widely employed in the servo loop (i.e., feedback loop) to dampen an undesirable oscillation of the heads 13 caused by the mechanical resonance.

The details of the fine controller 3 are shown in FIGS. 4, 5(a) and 5(b). A fine position amplifier 30 generates, from the position signal PS, a signal which is zero volts when the head is located at the center of a track, and otherwise has a positive or negative voltage proportional to the deviation from the center of the track to one side or the other. A clamp circuit 31 generates a clamped position signal by modifying the signal output from the fine position amplifier 30 to have saturations at predetermined positive and negative levels. The clamped position signal output from the clamp circuit 31 is then passed through a notch filter 32 and a high frequency filter 33 to a phase compensation circuit 34. The notch filter 32 has an attenuation characteristic shown in FIG. 5(b), such that the attenuation is maximum at the mechanical resonant frequency $f_0$. The high frequency filter 33 attenuates the high frequency gain of the servo loop to obtain a stable servo operation. The phase compensation circuit 34 also helps provide a stable servo operation, where an integrator circuit 34a integrates the output from the high frequency filter 33 for integral control (I); an amplifier 34b amplifies the output from the high frequency filter 33 for proportional control (P); and a differentiator circuit 34c differentiates the output from the high frequency filter 33 for derivative control (D). An adder circuit 34d adds the outputs from the integrator circuit 34a, the amplifier 34b and the differentiator circuit 34c, then outputs the position error signal $\Delta P$ to the switch 5.

The notch filter 32 is typically composed of a twin T-type filter as illustrated in FIG. 5(a). A twin T-type filter is configured as follows. A parallel connection of capacitors $C_1$ and $C_2$ connected to a connecting point of resistors $r_1$ and $r_2$ forms a first T-type network. A series connection of resistors $r_3$ and $r_4$ connected to a connecting point of capacitors $C_3$ and $C_4$ forms a second T-type network. By connecting these two T-type networks in parallel, the twin T-type filter is formed. In addition, operational amplifiers may be added to the twin T-type filter according to the following conditions. The output from resistor $r_2$ and capacitor $C_4$ is input to an amplifier AMP1 having a unity gain. The output of amplifier AMP1 is then divided by resistors $r_5$ and $r_6$, and the divided output voltage appearing across $r_6$ is input to another amplifier AMP2 having a unity gain. Output of the second amplifier AMP2 is fed to a return terminal $t_3$, which is the connecting point of capacitors $C_1$, $C_2$ and resistor $r_4$.

A notch frequency $f_0$ of the twin T-type filter is given by the following formula, where R indicates a resistance value R equal to the resistance of each resistor $r_1$ through $r_4$, and C indicates a capacitance value C equal to the capacitance of each capacitor $C_1$ through $C_4$.

$$f_0 = \frac{1}{2\pi CR} \qquad (1)$$

where,
$R = r_1 = r_2 = r_3 = r_4$
$C = C_1 = C_2 = C_3 = C_4$

Accordingly, the notch frequency $f_0$ can be adjusted by varying the resistance value R and/or the capacitance value C.

A problem, however, with the twin T-type filter is that each of the four resistors $r_1$ through $r_4$ or each of the four capacitors $C_1$ through $C_4$ must be replaced according to formula (1) for adjusting the resonant frequency while keeping the attenuation constant, when the disk unit 1 is replaced for servicing, etc.

Another conventional notch filter 32 previously used in a servo control circuit is a bridged T-type filter illustrated in FIG. 6. This type of filter has two major problems. First, the available attenuation, such as −12 dB, is not adequate and two, three or four capacitors or resistors must be replaced to adjust the resonant frequency while keeping the attenuation constant.

Each disk unit 1 does not always have the same resonant frequency even when the products are of the same design. Furthermore, if the design is changed for an improvement, etc., the resonant frequency consequently changes. The notch filter is typically mounted on a printed circuit board, which is installed in a main chassis on which the disk apparatus is installed. The exchange of the three or four circuit elements is a time consuming job requiring a precise instrument. Moreover, exchange of the printed circuit board is of course expensive. In any event, the cost for the production of a notch filter, as well as its servicing, is considerable. In order to avoid this problem, the notch filter may be mounted within the replaceable disk unit 1, in which the notch frequency is tuned at the factory, as disclosed in Japanese Unexamined Patent Publication Tokukai Sho No. 58-188374. However, the problem still remains because the frequency adjustment is a troublesome job even in a production line of a factory.

SUMMARY OF THE INVENTION

It is a general object of the invention to provide a filter which can be efficiently adjusted when used in a servo positioning apparatus to position a read/write head of a magnetic recording disk.

It is another object of the invention to provide an exchangeable disk unit structure which enables economical servicing and adjustment of the filter.

According to the present invention, a notch filter is used in a servo loop of a servo control circuit for dampening the mechanical resonance of the mechanism which is servo controlled. The notch filter comprises a capacitor-resistor (CR) network including a serial connection of first, second and third capacitors, having approximately equal capacitance, connected between an input terminal of the notch filter and an output terminal of the CR network; a first resistor connected between a return terminal of the CR network and an interconnection of the first and second capacitors; a second resistor connected between the return terminal and an interconnection of the second and third capacitors; and a third resistor connected in parallel to the three serial capacitors.

The notch frequency of the notch filter is adjusted by varying the resistance values of only the first and second resistors. The first and second resistors may be composed of fixed or potentiometer-type resistor(s) whose variable terminal is the return terminal.

An output from the CR network may be divided between fourth and fifth resistors to provide feedback to the return terminal. Moreover, the resistor(s) for adjusting the notch frequency may be separately installed in a detachable disk unit containing the mechanism to be servo controlled.

As a result, the frequency adjustment is efficient, and the detachable disk unit is less expensive. Furthermore, the detachable disk unit may be prepared with the notch frequency tuned to the resonant frequency of the corresponding mechanism while in the factory.

The above-mentioned features and advantages of the present invention, together with other objects and advantages, which will subsequently become apparent, reside in the details of construction and operation as more fully described hereinafter, reference being had to the accompanying drawings forming a part hereof, wherein like numerals refer to like parts throughout.

BRIEF DESCRIPTION OF THE DRAWINGS

FIG. 8 is a circuit diagram of a bridged serial T-type notch filter according to the present invention;

FIG. 9(a) is a plot of attenuation versus frequency illustrating the frequency characteristics of the filter of FIG. 8;

FIG. 9(b) is a plot of resistance versus frequency illustrating the effect of the variation of a resistance value on the notch frequency of a filter according to the present invention;

FIG. 10 is a plot of attenuation versus frequency illustrating the effect of feedback ratio on the frequency characteristics of a filter according to the present invention;

DESCRIPTION OF THE PREFERRED EMBODIMENTS

Figure 1:
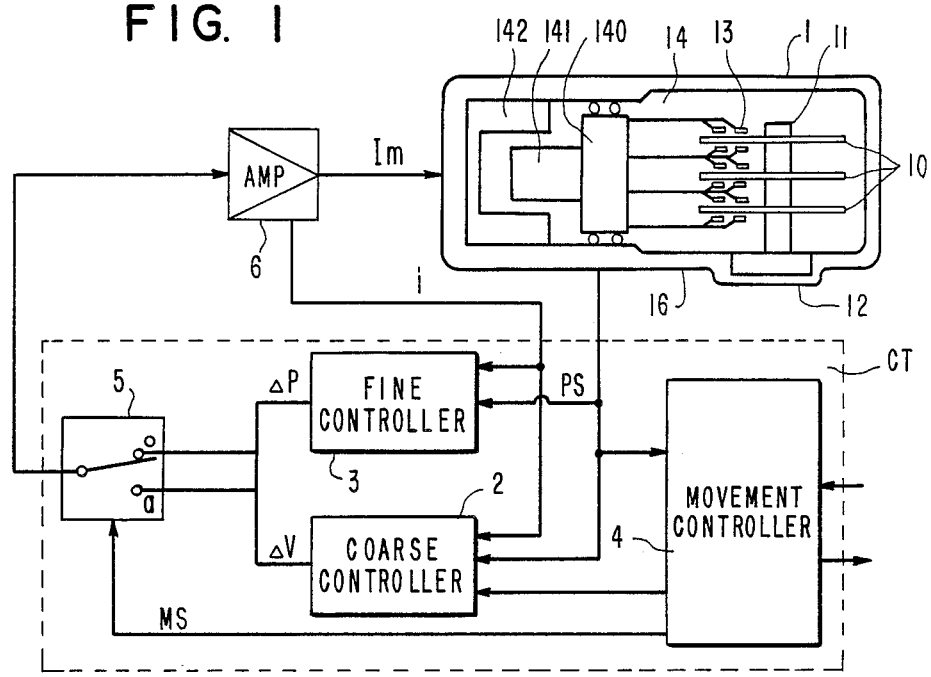
FIG. 1 is a block diagram of a servo positioning apparatus used in a recording disk system.

With reference to the block diagram shown in FIG. 7, an apparatus for servo-positioning read/write heads of a recording disk system, in which the present invention is applicable, is hereinafter described. Magnetic recording disks 10 are mounted on an axle 11 driven by a spindle motor 12 thus enabling the magnetic recording disks 10 to spin. Magnetic heads 13 are connected to a coil of a voice coil motor 14. The magnetic heads 13 are moved in an essentially radial direction relative to the disks 10 by the voice coil motor 14.

A position signal generator 7 generates a position signal PS depending on a servo signal SVS produced by one of the magnetic heads 13 reading servo signals from the track the head is currently on and its adjacent track, both recorded on a servo surface (typically the lower surface of the second disk). The position signal generator 7 includes an automatic gain control (AGC) amplifier 70, which keeps the servo signal SVS at an essentially constant amplitude; and a position signal detector 71, which decodes the AGC-controlled servo signal SVS to produce the position signal PS as shown in FIG. 2.

A velocity controller 2 includes a target velocity generator 20, a velocity signal generator 21 and an error signal generator 22. The target velocity generator 20 generates a target velocity $V_c$, according to a predetermined schedule. The predetermined schedule typically consists of a constant acceleration, a constant velocity and a constant deceleration, depending on the number of tracks to jump according to instructions from a movement controller 4. The velocity signal generator 21 generates a velocity signal $V_r$, which indicates proportionally the actual velocity of the magnetic head 13 depending on the position signal PS and an indication current i. The indication current i represents a proportion of the amplitude of a driving current $i_m$ of the voice coil motor 14 supplied from the power amplifier 6. The error signal generator 22 generates and supplies a velocity error $\Delta V$ to a switch 5 depending on the difference of the target velocity $V_c$ and the velocity signal $V_r$. Accordingly, the magnetic head 13 driven by the voice coil motor 14 moves with a given velocity to the destination track.

The movement controller 4 is composed of a microprocessor for receiving a seek instruction and a destination track number from a host processing device and for outputting instructions for the seek control. Input into the movement controller 4 is the position signal PS from the position signal detector 71 and the velocity signal $V_r$ from the velocity signal generator 21. Based upon the inputs, the movement controller 4 calculates the number of tracks the magnetic head 13 needs to jump which is output to the target velocity generator 20.

Figure 2:
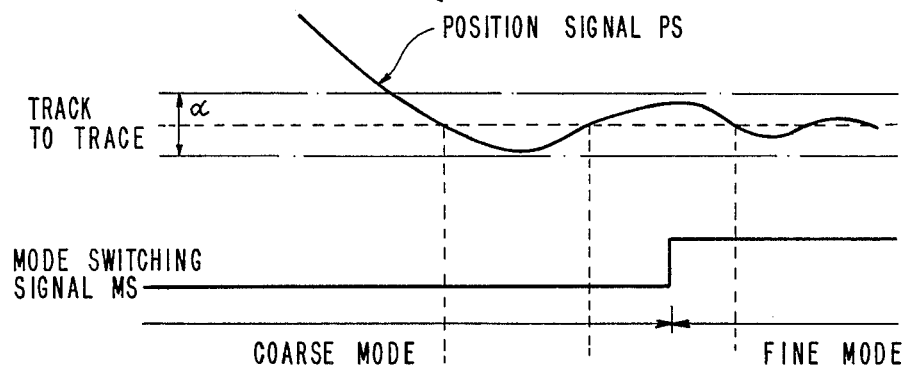
FIG. 2 is a graphical representation of a position signal in the vicinity of a destination track to be trace and timing of a mode switching signal to switch the control mode.

When the magnetic head 13 arrives at the destination track as shown in FIG. 2, the movement controller 4 detects this fact from the position signal PS and outputs a mode switching signal MS to the switch 5. This will cause switch 5 to switch from the "a" position to the "b" position, i.e., from the coarse controller 2 to the fine controller 3, to trace the track the magnetic head 13 is presently on, even though the track is eccentrically rotating. The movement controller 4 also functions to output a seek end signal to the host processing device when the seek operation is completed.

A fine controller 3 includes a fine position amplifier 30, a clamp circuit 31, a notch filter 32', a high frequency filter 33 and a phase compensation circuit 34. The fine position amplifier 30 generates, depending on the position signal PS, a signal which has a neutral voltage (e.g., zero volts) when the head is located at the center of a track and becomes either more positive or more negative in voltage proportional to a deviation from the center of the track to one side or the other. The clamp circuit 31 generates a clamped position signal which modifies the signal output from the fine position amplifier 30 to have saturations at predetermined positive and negative levels. The notch filter 32' has a notch frequency equal to the mechanical resonant frequency $f_0$ of the mechanism to be servo-controlled, i.e., the voice coil motor 14, the magnetic heads 13 and accessor members connecting the magnetic heads 13 to the voice coil motor 14, so that undesirable oscillation of the magnetic heads 13 is prevented. Additional details of the notch filter 32' are described below. The high frequency filter 33 is composed of a low pass filter connected to the output of the notch filter 32' to attenuate the high frequency gain of the servo loop in order to remove noises and to achieve a stable servo operation. The phase compensation circuit 34 is connected to the output of the high frequency filter 33 to attain a stable, quality servo operation.

The phase compensation circuit 34 includes an integrator circuit 34a, an amplifier 34b, a differentiator circuit 34c and an adder circuit 34d. The integrator circuit 34a integrates the output from the high frequency filter 33 for integral controlling. The amplifier 34b amplifies the output from the high frequency filter 33 for proportional controlling. The differentiator circuit 34c differentiates the output from the high frequency filter 33 for derivative controlling. The adder circuit 34d adds the outputs from the integrator circuit 34a, the amplifier 34b and the differentiator circuit 34c, then outputs the position error signal $\Delta P$ to switch 5.

Figure 7:
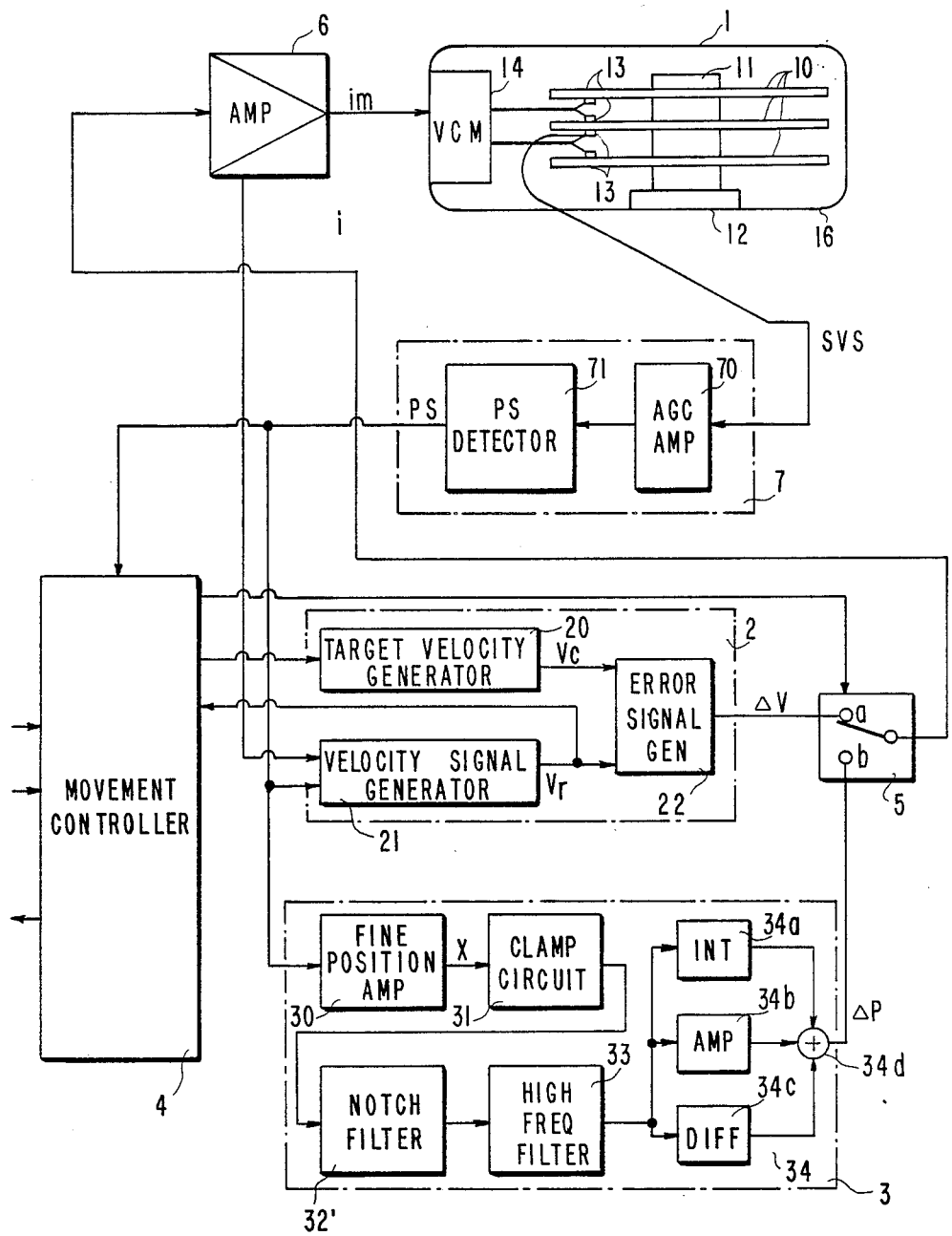
FIG. 7 is a block diagram of a servo controlling apparatus in which the present invention is embodied.

FIG. 8 is a circuit diagram of a bridged serial T-type filter of the present invention to be used as the notch filter 32' shown in FIG. 7. Capacitors $C_1$, $C_2$ and $C_3$ are connected in series between a first (input) terminal $t_1$ and a second (output) terminal $t_2$ of a capacitor-resistor (CR) network. A first resistor $R_1$ connects a third (return) terminal $t_3$ to a connection point or junction node of the capacitors $C_1$ and $C_2$. A second resistor $R_2$ connects the return terminal $t_3$ to a connection point or junction node of the capacitors $C_2$ and $C_3$. Thus, the capacitors $C_1$, $C_2$, $C_3$ and the resistors $R_1$, $R_2$ compose a serial T formation. A third resistor $R_3$ connects, i.e., bridges, the ends of the serial connection of the capacitors $C_1$, $C_2$ and $C_3$. The output terminal $t_2$ of the CR network is input to an amplifier AMP1 which typically has a unity gain. The output of amplifier AMP1 is divided by resistors $R_1$ and $R_5$, and the divided output level is input to a second amplifier AMP2 which typically has a unity gain. The first amplifier AMP1 isolates the CR network from effects of the divider resistors $R_4$ and $R_5$ and the input impedance of the next stage, i.e., the filter 33. The output of the second amplifier AMP2 is connected to the return terminal $t_3$ of the CR network.

In the bridged serial T-type filter, the notch frequency $f_0$ at which the gain of the filter is remarkably decreased is given by the following formula, $$f_0 = \frac{1}{2\pi C \sqrt{3 R_1 R_2}} \quad (2)$$

where, $$C_1 = C_2 = C_3 = C \quad (3)$$

$$R_3 = 6 (R_1 + R_2)$$

Accordingly, the notch frequency can be shifted as shown in FIG. 9(a) from $f_0$ to $f_0'$ by changing the resistance values of $R_1$ and $R_2$. In a typical case where the capacitance value $C_1 = C_2 = C_3 = 2200$ pF, the resistance value $R_3 = 287$ kilohms and a partial resistance assigned to $R_1$ and $R_2$ is varied while keeping the total resistance value $R_1 + R_2 = 47.7$ kilohms, the effect of the varied resistance on the notch frequency is shown in FIG. 9(b). As seen in FIG. 9(b), a notch frequency variation of more than 1 kHz is achieved, which is more than adequate to cover the variation of the mechanical resonant frequencies of the mechanisms being servo-controlled.

The ratio of the resistors $R_4$, $R_5$ which divide the output of the amplifier AMP1 determines the feedback ratio $(R_4/R_4 + R_5)$ which is fed back to the CR network by amplifier AMP2. The effect of the feedback ratio on the bandwidth of the notch frequency $f_0$ is shown in FIG. 10, where the values of the elements in the CR network are the same as those mentioned above. In FIG. 10, the curves (a) through (e) correspond to the feedback ratio 0.15, 0.35, 0.55, 0.75 and 0.95, respectively. As seen in this figure, the larger the feedback ratio the narrower the bandwidth of the notch filter 32' while the attenuation at the notch frequency is kept essentially constant.

Figure 6:
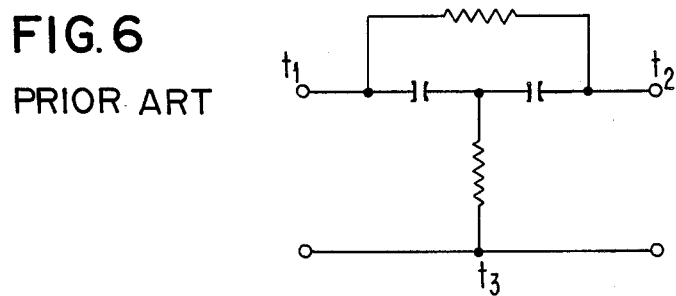
FIG. 6 is a circuit diagram of a bridged T-type notch filter used in a conventional servo positioning apparatus.

The attenuation at the notch frequency can be also kept essentially constant when the notch frequency is varied as illustrated in FIGS. 9(a) and 9(b). As illustrated in FIG. 10, the attenuation at the notch frequency is at least $-40$ dB, which is more than adequate for dampening the mechanical resonance, even if some drift in frequency takes place. Compare, the conventional bridged T-type filter shown in FIG. 6 which at best achieves an attenuation of $-12$ dB.

Figure 11A:
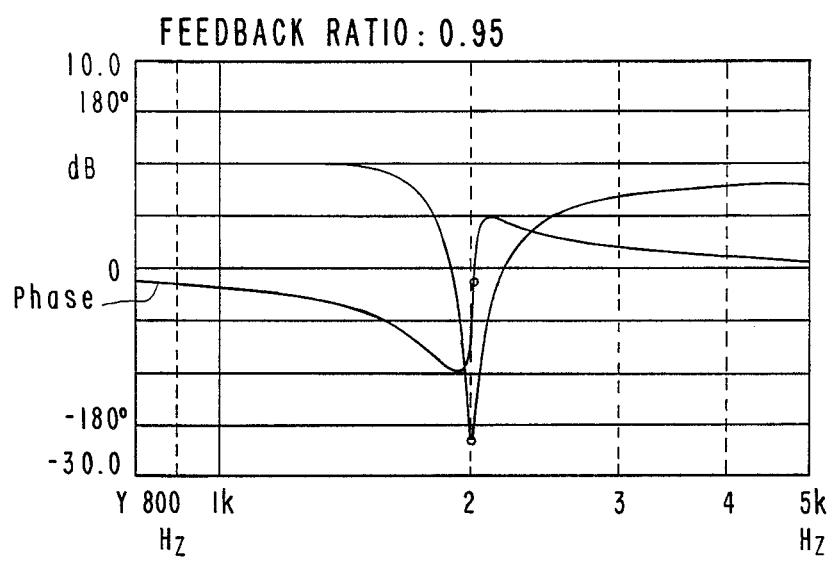
FIGS. 11(a) and 11(b) are plots of phase versus frequency illustrating the phase characteristics of a notch filter according to the invention.
Figure 11B:
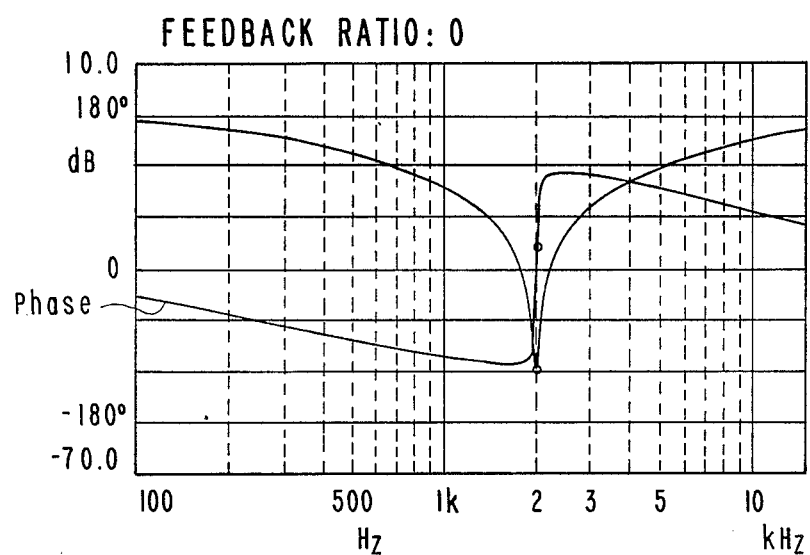

Phase rotation induced by the notch filter is another item of concern which needs to be controlled in the servo control system, particularly at lower frequencies, typically from 300 to 800 Hz, where the servo mechanism is often driven. If the phase rotation remains in this band of frequencies, the stability of the servo system is deteriorated. Phase characteristics of the notch filter 32' having the above-mentioned element values and a feedback ratio of 0.95 is shown in FIG. 11(a). As shown by the chart in FIG. 11(a), the amount of phase rotation at 800 Hz is approximately 10° which is fully satisfactory for this application. For comparison, FIG. 11(b) shows a similar filter having feedback ratio of zero, i.e., the return terminal $t_3$ is grounded. This results in a phase rotation of about 90°. The prior art bridged T-type filter shown in FIG. 6 has a phase rotation similar to that of FIG. 11(b).

Figure 3:
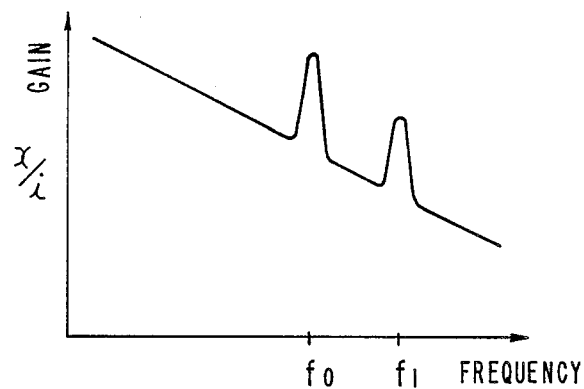
FIG. 3 is a plot of gain of the servo loop versus frequency before altering its frequency characteristics.
Figure 4:
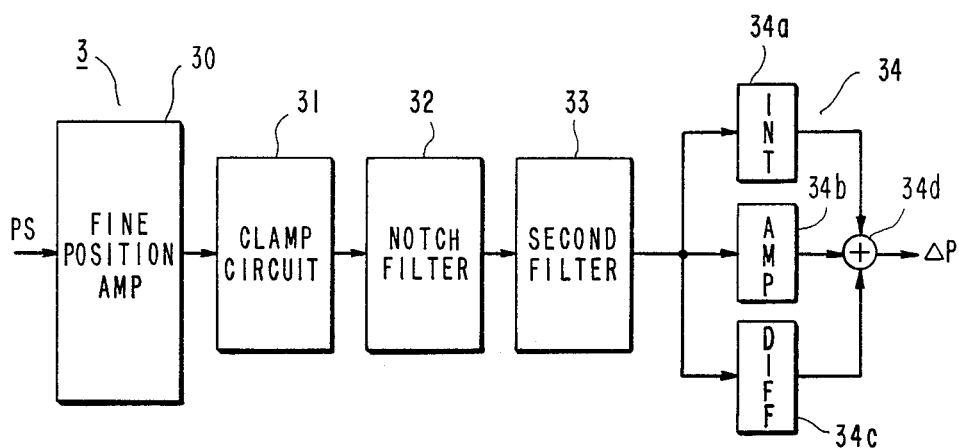
FIG. 4 is a block diagram of a fine controller used in the servo positioning apparatus of FIG. 1.
Figure 5A:
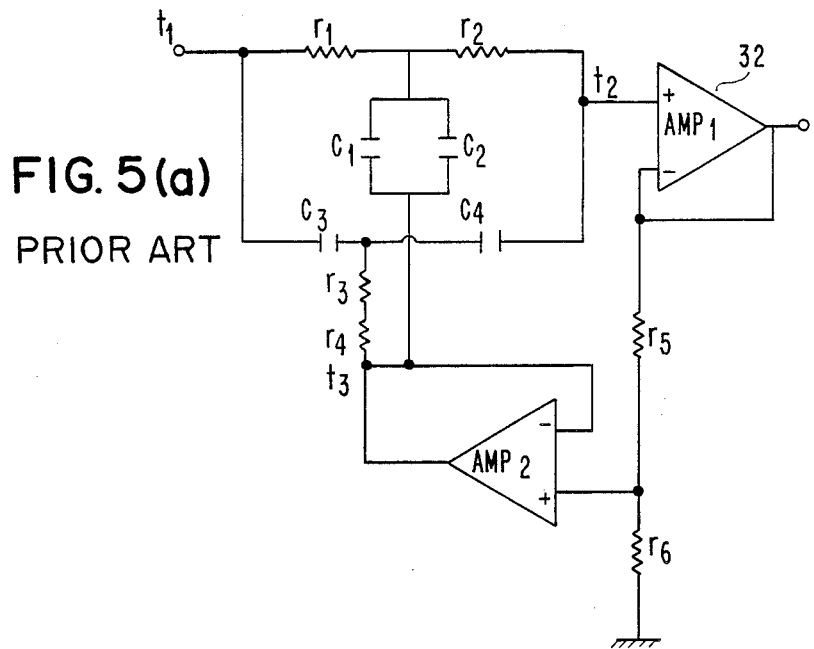
FIG. 5(a) is a circuit diagram of a twin T-type notch filter used in conventional servo positioning apparatus.
Figure 5B:
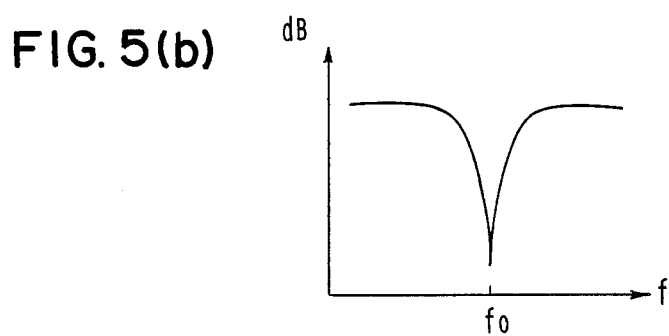
FIG. 5(b) is a plot of attenuation versus frequency illustrating the attenuation characteristics of the notch filter of FIG. 5(a)

One practical method of adjusting the notch frequency $f_0$ is as follows. Before adjusting the notch frequency $f_0$ of the notch filter 32', the mechanical resonant frequency of the mechanism to be servo-controlled is first measured. While the switch 5 is connected to terminal "b", a low level test signal having frequencies swept from 300 Hz to approximately 5.0 kHz is input to terminal "b", i.e., an input terminal of the power amplifier 6, from a signal generator (not shown in FIG. 7). Then, an output level x from the fine position amplifier 30 and the indication current i which is proportional to the driving current $i_m$ are measured for the various input frequencies. The gain of the power amplifier 6 and the movable parts of the mechanism, i.e., x/i, is calculated next. The gain versus frequency curve is then plotted as shown in FIG. 3. Location of the peak of the gain curve represents the mechanical resonant frequency $f_0$. Next, the resonant frequency $f_0$ is input to formula (2) to obtain resistance values of $R_1$ and $R_2$. The resistors $R_1$ and $R_2$ are adjusted to have the calculated resistance values.

According to formula (2), only two resistors need be replaced, instead of four elements necessary in the prior art twin T-type filter or three elements necessary in the bridged T-type filter. This considerably reduces the working time required for frequency adjustment of a filter both during production and, especially, when servicing the recording disk apparatus which requires exchange of the disk unit.

Figure 12A:
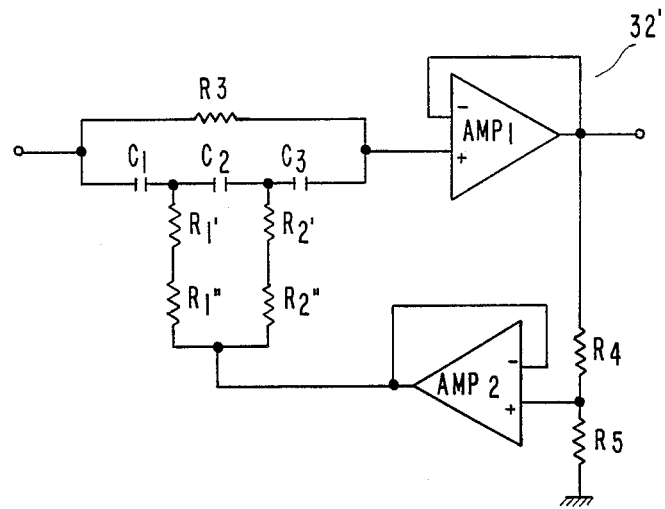
FIGS. 12(a and 12(b) are circuit diagrams of other embodiments of the present invention.
Figure 12B:
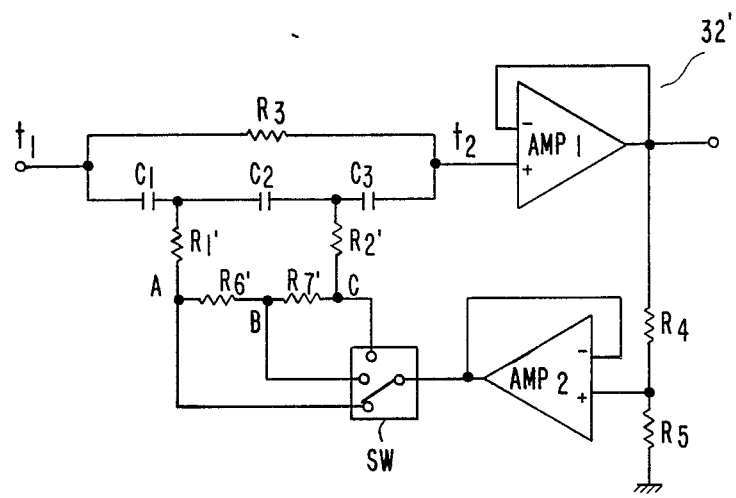

Referring to FIGS. 12(a) and 12(b), a second preferred embodiment of the present invention is hereinafter described. The first resistor $R_1$ consists of either $R_1'$ or the resistor $R_1'$ plus the series combination of resistors $R_1''$, $R_6'$, or $R_6' + R_7'$. The second resistor $R_2$ consists of either $R_2'$ or the resistor $R_2'$ plus the series combination of resistors $R_2''$, $R_7'$, or $R_7' + R_6'$. The sum of the resistance values of the resistors $R_1'$, $R_2'$, $R_1''$ and $R_2''$ (FIG. 12(a)), and $R_1'$, $R_2'$, $R_6'$ and $R_7'$ (FIG. 12(b)) are kept essentially one-sixth of the resistor $R_3$ to satisfy the formula (3). Adjustment of the notch frequency $f_0$ is carried out by changing the resistance values of $R_1''$ and/or $R_2''$ for the configuration shown in FIG. 12(a), or simply selecting one of connection points A, B or C at the junctions of resistors $R_1'$ and $R_6'$, and $R_7'$, and $R_7'$ and $R_2'$ using a switch SW acting as the return terminal $t_3$ to which the feedback from amplifier AMP2 is connected, for the configuration shown in FIG. 12(b). Thus, the resistance values of the first and second resistors $R_1$ and $R_2$ of formula (2) are varied.

Assuming $R_2' = R_1' + R_6' + R_7'$ for the configuration of FIG. 12(b), and if the switch SW selects "C", then $$R_1 = R_1' + R_6' + R_7' \quad (4)$$

$$R_2 = R_2'$$

the notch frequency will be the lowest possible frequency. If the switch SW selects "B", then $$R_1 = R_1' + R_6' \quad (5)$$

$$R_2 = R_2' + R_7'$$

Accordingly, the notch frequency comes higher than that of condition (4). If the switch selects "A", then $$R_1 = R_1' \quad (6)$$

$$R_2 = R_2' + R_6' + R_7'$$

Accordingly, the notch frequency will be the highest possible frequency.

Thus, the notch frequency can be selected to tune to three different frequencies to meet the resonant frequency $f_0$ of the mechanism of the magnetic disk unit 1. The number of taps of added resistors can be arbitrarily chosen depending on the design requirement, that is, two taps between resistors $R_1$ and $R_2'$ allow selection of two frequencies, four taps allow selection of four frequencies, etc.

Figure 13:
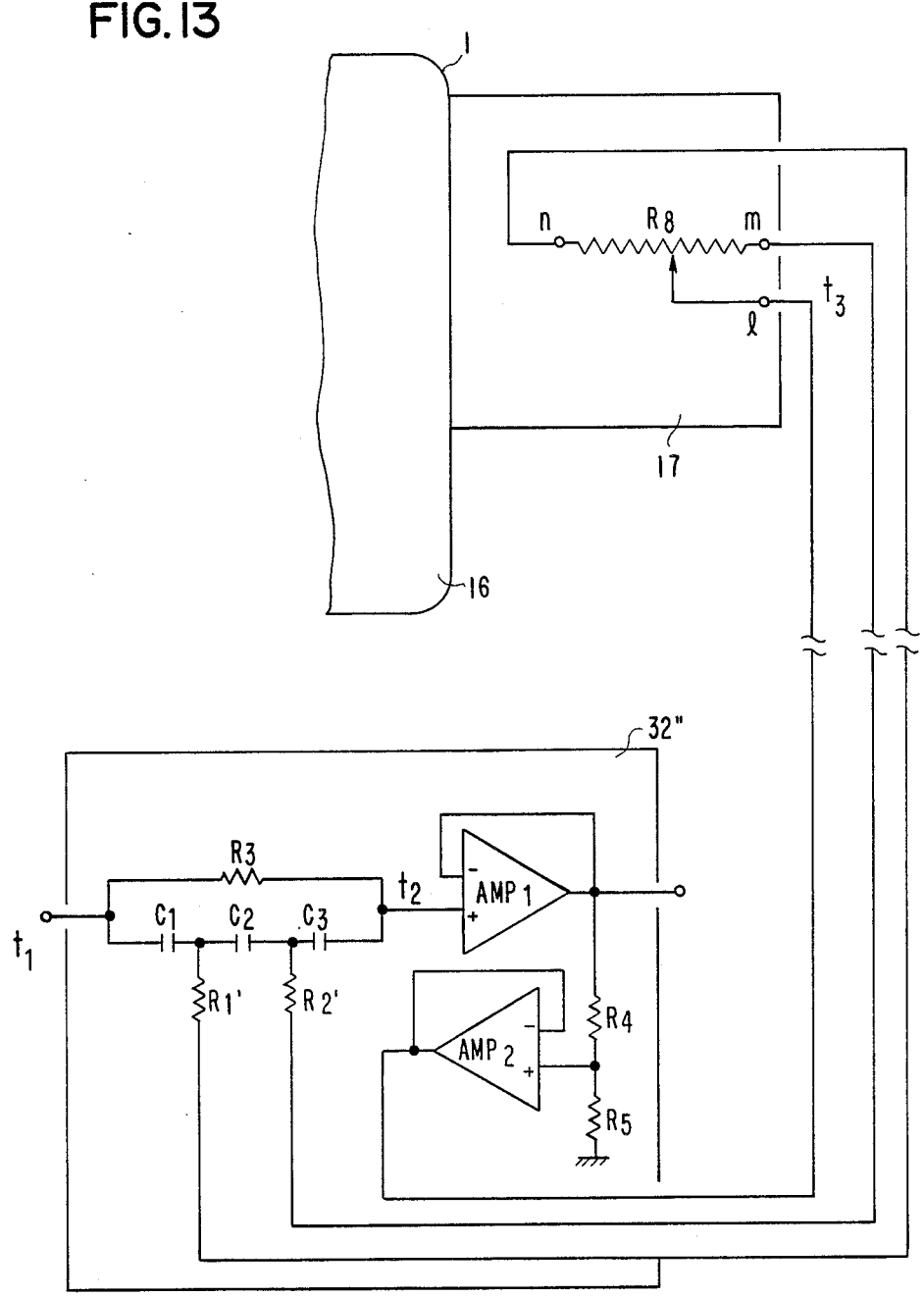
FIG. 13 is a circuit diagram of yet another embodiment of the present invention.

The two resistors $R_1''$ and $R_2''$ used in FIG. 12(a) may be replaced with a potentiometer-type variable resistor $R_8$ as shown in FIG. 13. Two fixed ends denoted with "m" and "n" of the variable resistor $R_8$ are connected to resistors $R_2'$ and $R_1'$, respectively. The sum of the resistance values of resistors $R_1'$, $R_2'$ and the total resistance of variable resistor $R_8$ is essentially one-sixth of that of resistor $R_3$. The variable terminal "l" of the variable resistor $R_8$ is used as the return terminal $t_3$ to which the output of the second amplifier AMP2 is connected. Accordingly, the frequency adjustment can be precisely and efficiently performed by observing frequency characteristics of the filter on a spectrum analyzer display while the input frequency to the filter is swept, or by calculation of formula (2).

As previously mentioned, even if the disk unit is produced under a common design, individual units have slightly different resonant frequencies from each other. Therefore, frequency adjusting elements, such as two resistors $R_1'$ and $R_2'$ used in FIG. 12(a), the resistors $R_6'$, $R_7'$ and the switch SW used in FIG. 12(b), or the potentiometer-type variable resistor $R_8$ may be installed in a circuit board 17 mounted on a disk unit 1, separately from the below-described main portion 32'' of the notch filter illustrated in FIG. 13.

An embodiment employing the variable resistor $R_8$ will now be described in more detail with reference to FIG. 13. The magnetic recording disks 10, the spindle motor 12, the magnetic head 13 and the voice coil motor 14 are installed in the disk unit 1. The disk unit 1 is detachable from the main chassis of the magnetic disk drive apparatus, for replacing recorded disks or servicing a defective unit. The main portion of the notch filter 32, including the elements which require no adjustment, such as capacitors $C_1$ through $C_3$, resistors $R_1'$, $R_2'$ and $R_3$, the amplifiers AMP1 and AMP2, are installed on a printed circuit board (which is represented by the numeral 32'' in FIG. 13) in a main chassis of the magnetic disk drive apparatus. In the main chassis of the magnetic disk drive apparatus, the resistance values and the capacitance values of the filter can be kept essentially the same and constant for each product. Therefore, in a factory where a new disk unit is completed, each one of the completed disk units 1 is first mounted in the main chassis of the magnetic recording apparatus, as an adjusting jig. Next, the mechanical resonance characteristic of the unit is measured according to the method described above for the first preferred embodiment. Then, the resistors $R_1''$ and $R_2''$ or the variable resistor $R_8$ installed in the circuit board 17 mounted on the disk unit 1 are adjusted so that the notch frequency is tuned to the mechanical resonant frequency $f_0$ of the mounted unit according to the above-described method. Next, the disk unit 1 is removed from the main chassis, to be stocked for later shipment. When a defective disk unit is to be replaced with a new disk unit in field, i.e., during servicing, the new disk unit will need no frequency adjustment, thus efficient servicing results.

Furthermore, the electronic circuit, e.g., circuit 17, installed in the disk unit 1, which must be replaced during servicing, can be made less expensive because the main portion of the filter does not have to be exchanged. Therefore, the servicing cost can be significantly reduced in both the required time and the hardware cost.

Although in the above embodiments, a single notch filter is employed in the fine controller 3, the mechanism which is servo-controlled generally has two or more resonances. Therefore, the notch filter 32' is preferably tuned to the major mechanical resonant frequency. Alternatively, one may provide the servo positioning apparatus with a plurality of notch filters.

In the above embodiments, a first amplifier AMP1 is provided to isolate the CR network from the effects of the dividing resistors $R_4$, $R_5$ and the input impedance of the high frequency filter 33. However, the first amplifier AMP1 may be omitted, as long as the effects of the dividing resistors and the input impedance of the high frequency filter 33 are negligible or compensatable by adjustment of the CR network. Moreover, in the above embodiments, a second amplifier AMP2 is provided to isolate the CR network from the effects of the dividing resistors. Likewise, the second amplifier AMP2 may be omitted, as long as the effects of the dividing resistors is negligible or within the amount of compensation provided by adjustment of the CR network.

In the above embodiments, the capacitance values of the capacitors $C_1$, $C_2$ and $C_3$ were chosen to be essentially equal. However, the capacitance values may be different from each other as long as the effects of the differing capacitance is negligible or compensatable by adjustment of the CR network. Moreover, in the above embodiments, the sum of the resistance values of the resistors $R_1$ and $R_2$ was chosen to be essentially one-sixth of the resistance values of the resistor $R_3$. However, the resistance values may deviate from this condition as long as the effect is negligible or compensatable by adjustment of the CR network.

Although in the above embodiments a magnetic disk drive apparatus is referred to representatively, the present invention is applicable to a servo positioning apparatus in any system, such as an optically recording disk apparatus, etc.

The many features and advantages of the invention are apparent from the detailed specification and thus, it is intended by the appended claims to cover all such features and advantages of the system which fall within the true spirit and scope of the invention. Furthermore, since numerous modifications and changes will readily occur to those skilled in the art, it is not desired to limit the invention to the exact construction and operation shown and described. Accordingly, all suitable modifications and equivalents may be resorted to as falling within the scope and spirit of the invention.

What is claimed is:

1. A servo positioning apparatus, comprising:
   positioning means, having a resonant frequency, for positioning an object and for outputting a position signal corresponding to a position of the object; and
   a servo controller for outputting a servo signal to said positioning means in dependence upon the position signal, said servo controller including a bridged serial T-type notch filter having a notch frequency substantially equal to the resonant frequency.

2. A servo positioning apparatus as recited in claim 1, wherein said bridged serial T-type notch filter has first, second and third terminals, the first and second terminals providing input and output terminals, respectively, and said bridged serial T-type notch filter comprises:
- first and second resistors each having first and second ends, the first ends connected together at the third terminal of said bridged serial T-type notch filter; and
- at least one capacitor connected between the second ends of said first and second resistors.

3. A servo positioning apparatus as recited in claim 1, wherein said bridged serial T-type notch filter has first, second and third terminals, the first and second terminals providing input and output terminals, respectively, and said bridged serial T-type notch filter comprises:
- at least three series-connected capacitors having first and second terminal nodes, operatively connected to the input and output terminals of said bridged serial T-type notch filter, respectively, and at least two junction nodes;
- a first resistor connected between the third terminal of said bridged serial T-type notch filter and a first junction node of said series-connected capacitors;
- a second resistor connected between said third terminal of said bridged serial T-type notch filter and a second junction node of said series-connected capacitors; and
- a third resistor connected between the terminal nodes of and in parallel with said series-connected capacitors.

4. A servo positioning apparatus as recited in claim 3, wherein said series-connected capacitors have substantially equal capacitance values.

5. A servo positioning apparatus as recited in claim 4, wherein a sum of the resistance values of said first and second resistors is approximately equal to one-sixth of the resistance value of said third resistor.

6. A servo positioning apparatus as recited in claim 3, wherein the third terminal is operatively connected to ground.

7. A servo positioning apparatus as recited in claim 3, wherein the output terminal of said bridged serial T-type notch filter is operatively connected to the third terminal thereof to provide feedback.

8. A servo positioning apparatus as recited in claim 7, wherein said bridged serial T-type notch filter further includes:
- a fourth resistor, having a first end operatively connected to the output terminal of said bridged serial T-type notch filter and a second end operatively connected to the third terminal of said bridge serial T-type notch filter; and
- a fifth resistor, having a first end connected to the second end of said fourth resistor and having a second end operatively connected to ground.

9. A servo positioning apparatus as recited in claim 8, wherein said bridged serial T-type notch filter further includes a first amplifier operatively connected between the second terminal node of said series-connected capacitors and the output terminal of said bridged serial T-type notch filter.

10. A servo positioning apparatus as recited in claim 9, wherein said bridged serial T-type notch filter further includes a second amplifier operatively connected between the second end of said fourth resistor and the third terminal of said bridged serial T-type notch filter.

11. A servo positioning apparatus as recited in claim 10, wherein said first and second amplifiers each have a substantially unity gain.

12. A servo positioning apparatus as recited in claim 1, wherein said bridged serial T-type notch filter has first, second and third terminals, the first and second terminals providing input and output terminals, respectively, and said bridged serial T-type notch filter comprising:
- a variable resistor having a pair of fixed terminals and a variable terminal, the variable terminal operatively connected to the third terminal of said bridged serial T-type notch filter; and
- at least one capacitor connected between the fixed terminals of said variable resistor.

13. A servo positioning apparatus for positioning an object in a detachable unit, said apparatus comprising:
- positioning means for positioning the object and for outputting a position signal corresponding to a position of the object, said positioning means installed in the detachable unit, said positioning means having a resonant frequency;
- a servo controller for outputting a servo signal to said positioning means in dependence upon the position signal, including a notch filter with a notch frequency substantially equal to the resonant frequency; and
- adjusting means, disposed in the detachable unit, for adjusting the notch frequency.

14. A servo positioning apparatus as recited in claim 13, wherein said notch filter is a bridged serial T-type filter.

15. A servo positioning apparatus as recited in claim 14, wherein said bridged serial T-type notch filter has first, second and third terminals, the first and second terminals providing input and output terminals, respectively, and said bridged serial T-type notch filter comprises:
- first and second resistors each having first and second ends, the first ends connected together at the third terminal of said bridged serial T-type notch filter; and
- at least one capacitor connected between the second ends of said first and second resistors.

16. A servo positioning apparatus as recited in claim 14, wherein said bridged serial T-type notch filter has first, second, third and fourth terminals, the first and second terminals providing input and output terminals, respectively, and said bridged serial T-type notch filter comprises:
- at least three series-connected capacitors having first and second terminal nodes, operatively connected to the input and output terminals of said bridged serial T-type notch filter, respectively, and at least two junction nodes;
- a first resistor connected between the third terminal of said bridged serial T-type notch filter and a first junction node of said series-connected capacitors;
- a second resistor connected between the fourth terminal of said bridged serial T-type notch filter and a second junction node of said series-connected capacitors; and
- a third resistor connected between the terminal nodes of and in parallel with said series-connected capacitors.

17. A servo positioning apparatus as recited in claim 16, wherein said bridged serial T-type notch filter further comprises:
- a fourth resistor, in the detachable unit and having a first end operatively connected to the output terminal of said bridged serial T-type notch filter and a second end operatively connected to the third terminal of said bridged serial T-type notch filter; and a fifth resistor, in the detachable unit and having a first end connected to the first end of said fourth resistor and having a second end operatively connected to the fourth terminal of said bridged serial T-type notch filter.

18. A servo positioning apparatus as recited in claim 16, wherein said bridged serial T-type notch filter further comprises a variable resistor installed in the detachable unit and having a pair of fixed terminals and a variable terminal, the variable terminal operatively connected to the output terminal of said bridged serial T-type notch filter and the fixed terminals operatively connected to the third and fourth terminals of said bridged serial T-type notch filter.

19. A servo pensioning apparatus for positioning heads in a disk unit having tracks, comprising:

positioning means for positioning heads and for outputting a position signal corresponding to a position of the heads relative to the tracks, said positioning means installed in the disk unit and having a resonant frequency; and a servo controller for outputting a servo signal to said positioning means in dependence upon the position signal, including a bridged serial T-type notch filter having first, second and third terminals, the first and second terminals providing input and output terminals, respectively, and having a notch frequency substantially equal to the resonant frequency, said bridged serial T-type notch filter including:

at least three series-connected capacitors having first and second terminal nodes, operatively connected to the input and output terminals of said bridged serial T-type notch filter, respectively, and at least two junction nodes;

a first resistor connected between the terminal nodes of and in parallel with said series-connected capacitors;

second and third resistors serially connected between the third terminal of said bridged serial T-type notch filter and a first junction node of said series-connected capacitors, an end of said third resistor being connected to the third terminal; and fourth and fifth resistors serially connected between the third terminal of said bridged serial T-type notch filter and a second junction node of said series-connected capacitors, an end of said fifth resistor being connected to the third terminal, said third and fifth resistors being separately installed in the disk unit.

20. A servo positioning apparatus according to claim 19, wherein the output terminal of said bridged serial T-type notch filter is operatively connected to the third terminal thereof to provide feedback.

21. A servo positioning apparatus according to claim 19, wherein said servo controller provides a servo loop and further comprises phase compensation means for adjusting phase characteristics of the servo loop.

22. A notch filter, having first, second and third terminals, the first and second terminals providing input and output terminals, respectively, and having a notch frequency, for filtering out a mechanical resonance frequency from a servo control signal, comprising:

resistor-capacitor means having terminal nodes, operatively connected to the input and output terminals of said notch filter, and junction nodes, for providing a signal path between the input and output terminals of said notch filter; and adjusting means, operatively connected between the junction nodes of said resistor-capacitor means and the third terminal of said notch filter, for adjusting the notch frequency without changes in said resistor-capacitor means.

23. A notch filter as recited in claim 22, wherein said resistor-capacitor means comprises:

first and second resistors each having first and second ends, the first ends each connected to said adjusting means; and at least one capacitor connected between the second ends of said first and second resistors.

24. A notch filter as recited in claim 22, wherein said resistor-capacitor means comprises:

at least three series-connected capacitors having first and second terminal nodes, operatively connected to the input and output terminals of said notch filter, respectively, and at least two junction nodes;

a first resistor connected between the adjusting means of said notch filter and a first junction node of said series-connected capacitors;

a second resistor connected between said adjusting means of said notch filter and a second junction node of said series-connected capacitors; and a third resistor connected between the terminal nodes of and in parallel with said series-connected capacitors.

25. A servo positioning apparatus recited in claim 13, wherein said detachable unit comprises a disk, and said object is a head for writing and reading information in said disk.

26. A servo positioning apparatus recited in claim 19, wherein said disk unit is detachable.

* * * * *